(No Model.) 6 Sheets—Sheet 1.

M. T. CHAPMAN.
APPARATUS FOR OPERATING ROTARY DRILLS.

No. 409,272. Patented Aug. 20, 1889.

Witnesses:
Albert H. Adams.
Harry T. Jones.

Inventor:
Matthew T. Chapman (No Model.) 6 Sheets—Sheet 2.
M. T. CHAPMAN.
APPARATUS FOR OPERATING ROTARY DRILLS.
No. 409,272. Patented Aug. 20, 1889.
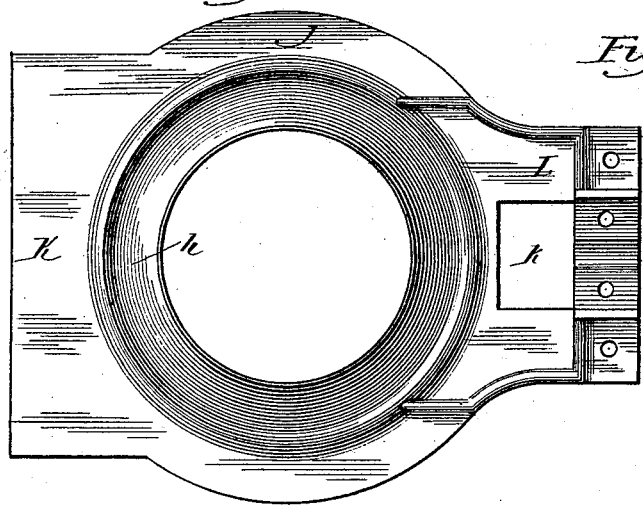
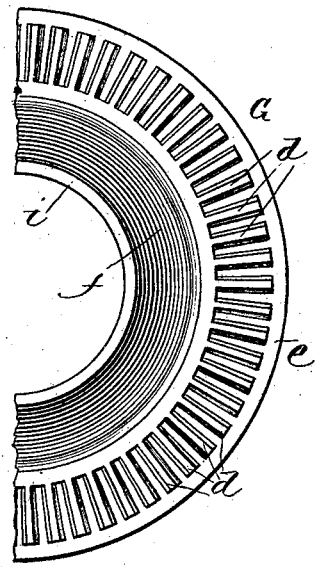
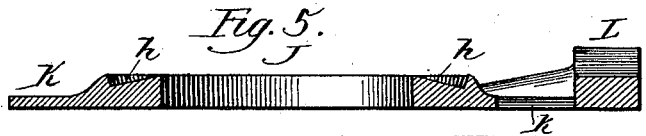
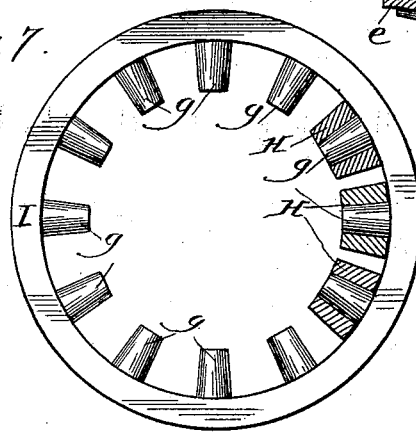
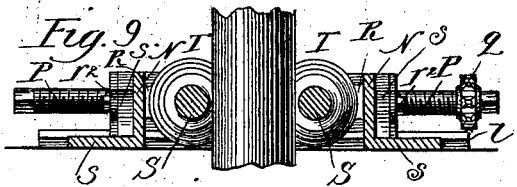
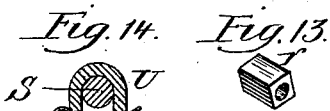
Witnesses:
Albert H. Adams.
Harry T. Jones.
Inventor:
Matthew T. Chapman
N. PETERS, Photo-Lithographer, Washington, D. C.

(No Model.) 6 Sheets—Sheet 3.
M. T. CHAPMAN.
APPARATUS FOR OPERATING ROTARY DRILLS.
No. 409,272. Patented Aug. 20, 1889.
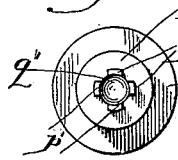
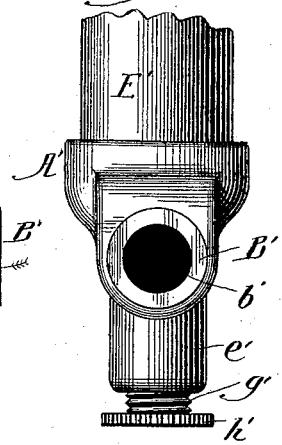
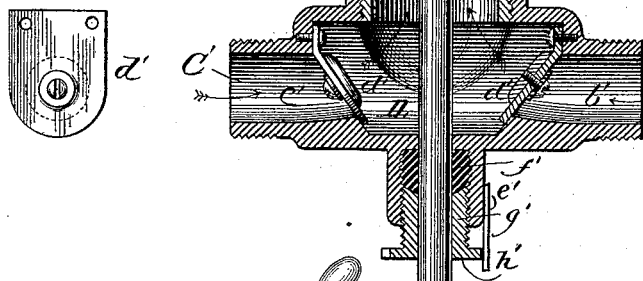
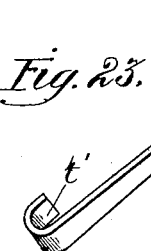
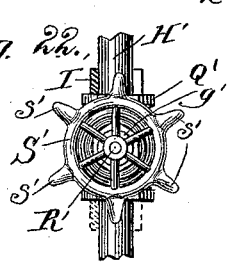
Witnesses:
Albert N. Adams.
Harry T. Jones.
Inventor:
Matthew T. Chapman (No Model.) 6 Sheets—Sheet 4.
M. T. CHAPMAN.
APPARATUS FOR OPERATING ROTARY DRILLS.
No. 409,272. Patented Aug. 20, 1889.
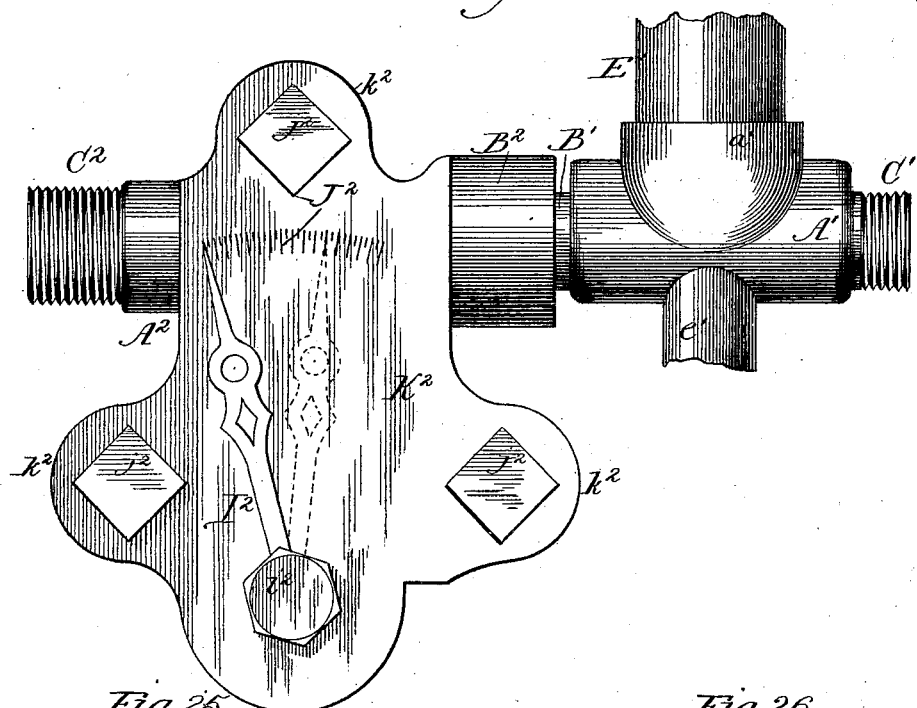
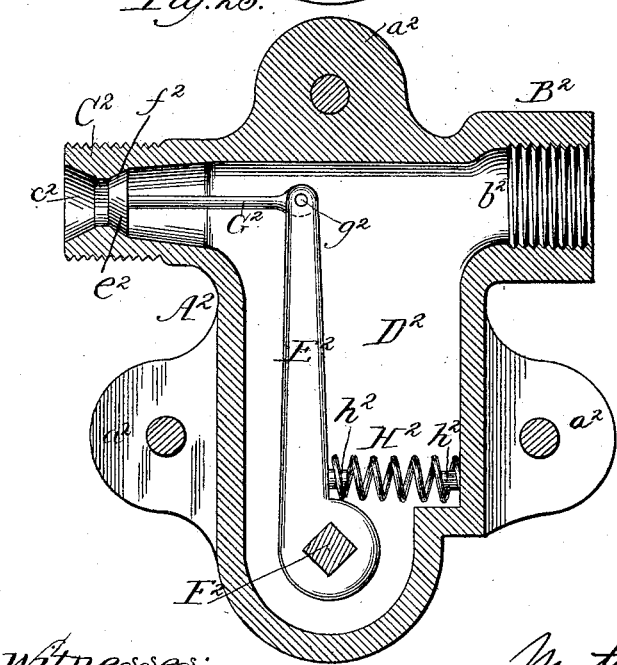
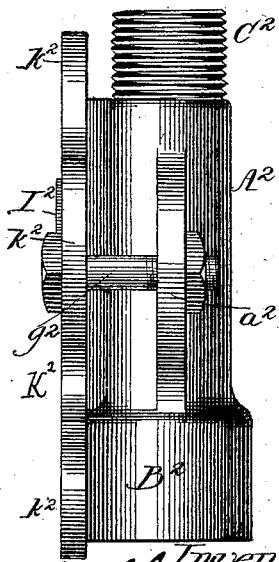
Witnesses:
Albert H. Adams.
Harry T. Jones.
Inventor:
Matthew T. Chapman

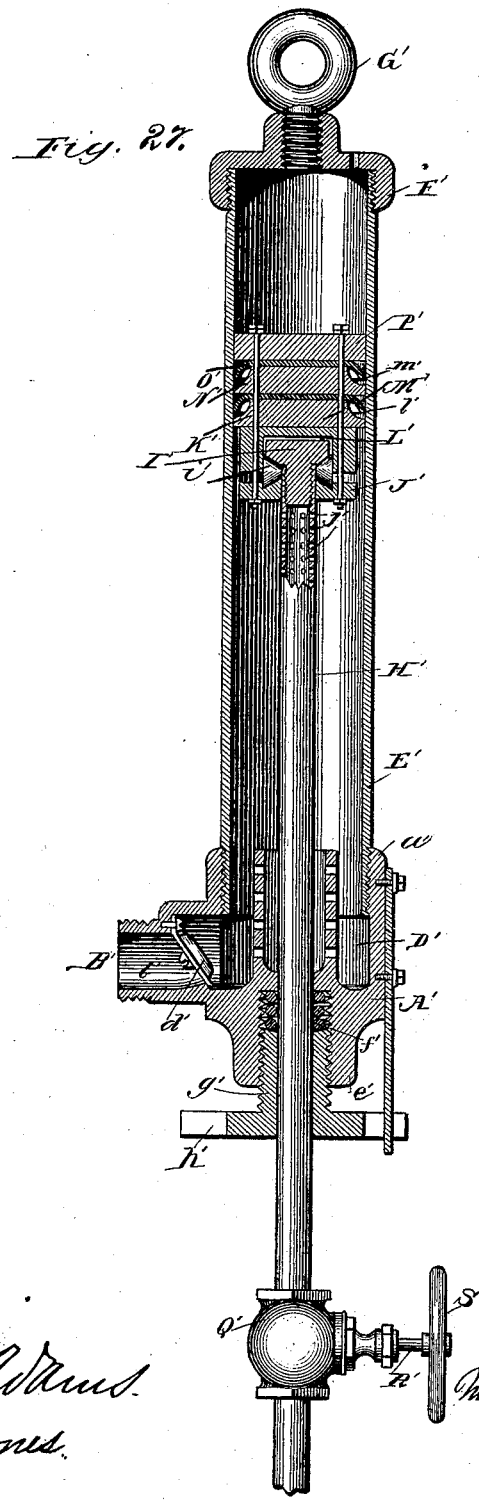

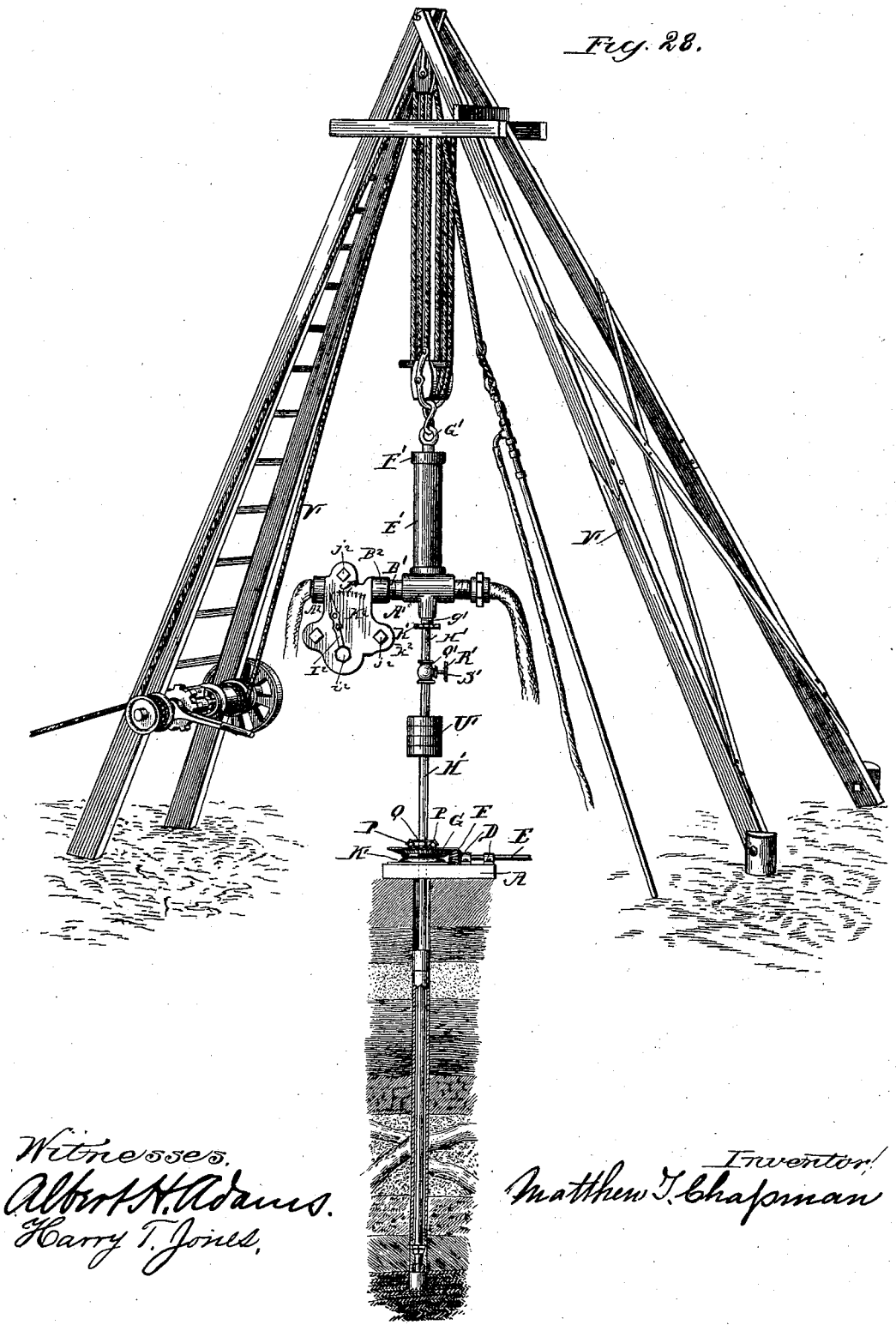

UNITED STATES PATENT OFFICE.

MATTHEW T. CHAPMAN, OF AURORA, ILLINOIS.

APPARATUS FOR OPERATING ROTARY DRILLS.

SPECIFICATION forming part of Letters Patent No. 409,272, dated August 20, 1889.

Application filed February 13, 1888. Serial No. 263,825. (No model.)

*To all whom it may concern:*

Be it known that I, MATTHEW T. CHAPMAN, residing at Aurora, in the county of Kane and State of Illinois, and a citizen of the United States, have invented new and useful Improvements in Apparatus for Operating Rotary Drills, of which the following is a specification, reference being had to the accompanying drawings, in which—

Figure 1:
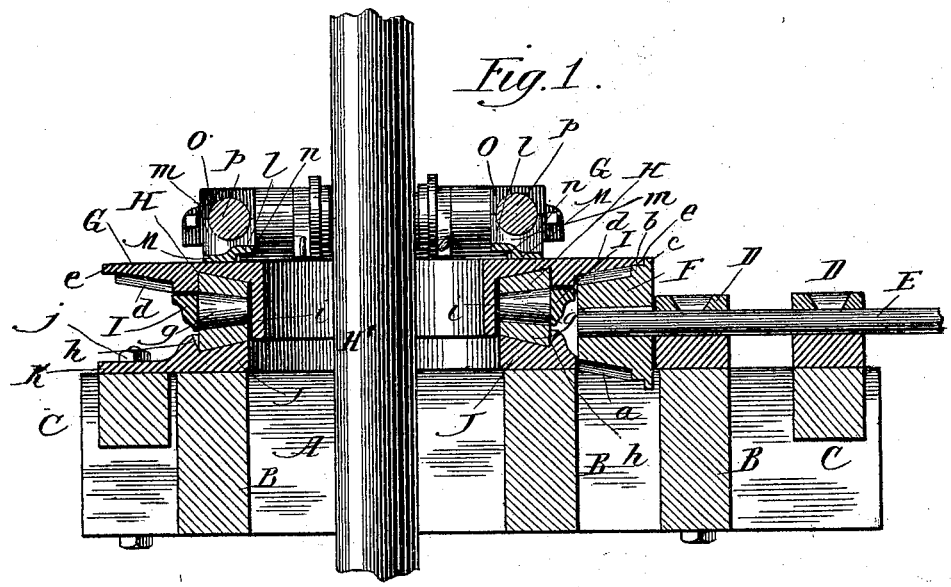
Figure 2:
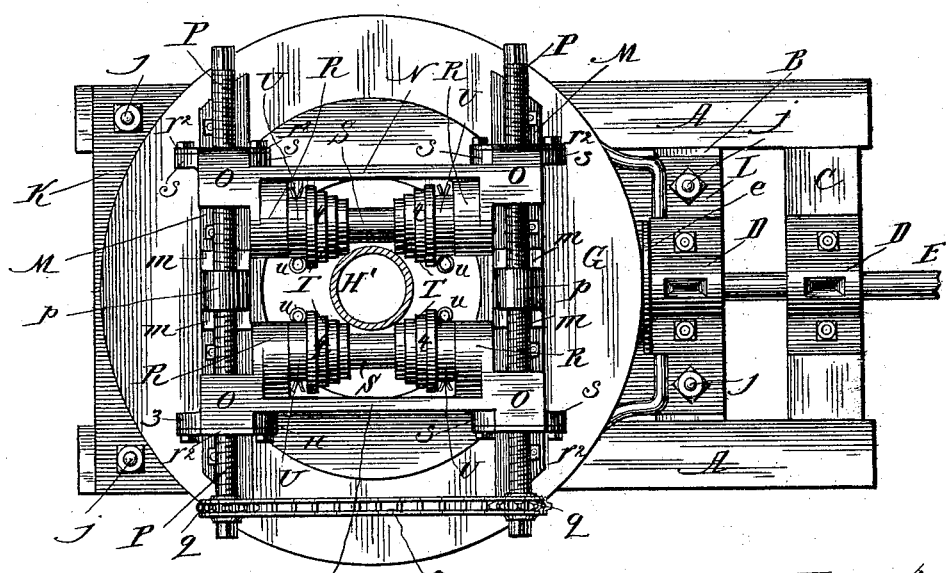

Figure 1 is a sectional elevation. Fig. 2 is a top or plan view. Fig. 3 is a top or plan view of the bottom supporting-plate. Fig. 4 is a detail showing the under side of the revolving top plate. Fig. 5 is a longitudinal section of the plate of Fig. 3. Fig. 6 is an edge elevation, partly in section, of the revolving top plate. Fig. 7 is a top view of the carrying-ring, showing a portion of the anti-friction rollers in section. Fig. 8 is an edge elevation, partly in section, of the ring of Fig. 7. Fig. 9 is a cross-section through the clamping devices, showing the tube in elevation. Fig. 10 is a longitudinal section through the adjusting-screw for the clamp. Fig. 11 is a top view of one of the screw and clamp supporting plates. Fig. 12 is a side elevation of one of the plates carrying the clamping-jaws. Fig. 13 is a perspective view of the rubber cushion. Fig. 14 is a detail in section of the collars for adjusting the clamping-jaws. Fig. 15 is a sectional elevation of the feed-regulator. Fig. 16 is an end elevation of the receiving-head. Fig. 17 is a detail of the valve of the receiving-head to prevent a return of the water. Fig. 18 is a side elevation of the clamp plug or head for the piston. Fig. 19 is a bottom view of Fig. 18. Fig. 20 is a side elevation of the cage of the piston. Fig. 21 is a top view of Fig. 20. Fig. 22 is a detail, being an end elevation of the shut-off. Fig. 23 is a perspective view of the handle for operating the shut-off from the rotation of the drill-rod. Fig. 24 is a detail showing an indicator attached to the pressure-head to show if the water is running properly. Fig. 25 is a sectional view of the indicator on line $y\ y$ of Fig. 26. Fig. 26 is a top or plan view of the indicator. Fig. 27 is a sectional elevation showing a modified form of the feed-regulating device. Fig. 28 is an elevation showing the feed-regulating device in connection with the derrick and the mechanism for rotating the drill rod or tube.

The operation of sinking wells in the ground by the employment of a rotary diamond or other drill requires a rotation of the drill-tube with an endwise movement of the tube for feeding purposes; and the objects of this invention are to improve the construction and operation of the gripping mechanism by which the drill-tube or other circular body is caught and rotated without preventing the endwise movement thereof for feeding or other purposes, the improvement in the gripping mechanism more especially relating to the adjustment of the clamping-jaws to grasp tubes or rods of varying diameters and the rotation of the clamping-jaws to carry the tube or rod around, the regulating of the feed of the drill by the pressure of the water forced through the drill tube or rod to wash away the cuttings, and at the same time, in case of choking at the drill end, have the pressure of the water act on a piston to raise the drill-tube for the water to escape and clear the drill, and when the drill is cleared or the choking removed the escape of the water will relieve the pressure on the piston, allowing the drill to descend in position for work, and to notify the operator whether the water-supply is passing through the drill-tube properly or its passage is closed.

My invention consists in the several parts and combinations of parts hereinafter described, and pointed out in the claims as new.

In the drawings, Sheets 1 and 2, Figs. 1 to 14, both inclusive, show the rotating clamp, in which—

A represents the side pieces of the frame.

B are the cross-pieces, three being used, as shown in Figs. 1 and 2.

C are end supporting-pieces.

D are journal-boxes—one on the cross-piece B, as shown in Figs. 1 and 2, and the other on the supporting-piece C.

E is the main driving-shaft.

F is a beveled driving-gear keyed or otherwise secured to the end of the shaft E, and provided on its exterior face with cogs $a$, a shoulder $b$, and a flange or rib $c$.

G is the revolving top plate, having on its under side cogs or leaves $d$ to mesh with the cogs or leaves $a$, and having at its periphery, on its under side, a flat face $e$ to run on the shoulder $b$.

H are anti-friction rollers, each roller having a beveled exterior face.

I is a carrying-ring for the rollers H, the ring having a series of beveled pins $g$, on which the rollers are mounted. The rollers run in a groove $f$, formed in the under face of the plate G and in a groove $h$, formed in the top face of a bottom plate, as shown in Fig. 1, and the rollers are held against an inward end movement by a depending flange $i$ from the top plate G around the central opening of such plate.

J is the bottom supporting-plate, having the groove $h$ for the rollers H, and having a central circular opening, as shown in Figs. 1, 3, and 5.

K is an end extension of the plate J through which and the side pieces A bolts $j$ are passed for attaching the bottom plate firmly in position.

L is an end extension of the plate J, having, as shown, an opening $k$ for the gear F, and having also formed therewith one-half of one of the boxes D, and through this plate and the side pieces A bolts $j$ pass to hold the plate in position.

M are plates bolted or otherwise firmly secured to the top plate G on opposite sides of the central opening, so that the two plates will run parallel with each other, and each plate M has its inner edge $l$ struck up, so as to leave between this edge and the face of the plate G, an opening or groove, and each plate M at its center has two ears $m$, each ear having a semicircular recess, as shown in Fig. 11.

N are plates running from one plate M to the other, and each plate N has a semicircular flange $n$, the corner of which, when the parts are together, lies in the groove between the edge $l$ of the plate M and the face of the top plate, so that the plates N can be advanced and receded.

O are heads—one at each end of each plate N, and each head has a rectangular recess $o$.

P are screws having at the center a ring $p$, and the body of the screw on one side of the ring is cut right-handed and on the other side left-handed. The ring $p$ lies between the ears $m$ of the plate M, and the body of the screw at each end passes through the head O, and each head O has in its recess $o$ a rubber cushion $r$ and a nut $r'$, through which cushion and nut the screw passes, and the cushion and nut are held in the recess by a plate $r^2$, bolted or otherwise secured to ears $s$ on the head O.

Q is a drive-chain running over sprocket-wheels $q$, secured to the ends of the screws P, and, as shown, the ends of each screw P are squared to receive the hub of the sprocket-wheel, and by means of the chain Q and sprocket-wheels $q$ both screws P will be operated simultaneously.

R are ears projecting out from the plate N, adjacent to each head O.

S is a shaft secured in the ears R, a shaft being provided for each plate N.

T are cone-shaped clamping-jaws, the contact-face of each jaw having shoulders or steps $t$ to form sharp biting-edges, and two jaws are mounted on each shaft S and are free to slide and to revolve on the shaft.

The jaws are each composed of a series of separate and independent rings of different diameters, which loosely fit shaft S, and the edges of the rings form the shoulders or steps $t$. These rings can be taken off and turned or reversed, so as to present their unworn edges when the other edges become worn or injured. When it is desired to grip a larger or a smaller drill-tube, a ring (one or more) is removed or put on, as the occasion requires. To accommodate the sectional jaws to different sizes of drill-tubes, I employ adjusting-collars U, formed in sets of varying widths, each collar having an opening to slip it on or off the shaft S, for the purpose of setting the rings comprising the stepped jaws to the proper distance apart to grip the drill-tube. For objects of large diameter the collars U are omitted and the outer rings of the jaws made to abut against the ears or flanges R of the plates N.

H' is the pipe or tube to be clamped.

The bottom plate J is bolted or otherwise firmly secured to its supporting-frame. The driving-shaft E, with its pinion F, is mounted in the boxes D for the pinion to lie within the opening $k$. The ring I, with the anti-friction rollers H thereon, is dropped into position for the rollers to lie in the recess $h$ of the bottom plate J. The plates M are bolted to the top plate G, and the plates N, with the shafts S and jaws T thereon, are entered on the screws P and the screws placed in position for the ring $p$ to lie between the ears $m$, when by turning the screws the plates N, with their jaws, can be advanced for the flange $n$ to pass into the grooves beneath the lips $l$ of the plates M. The top plate G, with the plates N and jaws T thereon, is dropped into place for the gear $d$ to mesh with the gear $a$ of the pinion F and the flange $i$ to lie adjacent to the inner ends of the anti-friction rollers H. The machine is then ready for use.

In use the jaws T are adjusted endwise to suit the diameter of the pipe or tube to be clamped by placing the proper-sized collar U on the shaft S between the jaws T and ears R, and the jaws are adjusted endwise for the diameter of the pipe or tube by turning the screws P to advance or recede the jaws, as may be required, and when the proper adjustment has been had the pipe or tube H' is inserted in the center space between the jaws and the jaws advanced by turning the screws P to bite onto the pipe or tube. The jaws will bite the pipe or tube sufficiently to rotate the pipe or tube with the rotation of the top plate G from the driving gear or pinion F, and at the same time, the jaws being free to rotate on their shafts S, a free end movement of the pipe or tube clamp is had, by which the tube can be fed forward without interfering with its rotation with the top plate G, and its rotation with the top plate does not interfere with its end movement, the result being that the pipe or tube has both a rotary movement around its center and an endwise movement at the same time.

The devices for supplying the water and regulating the feed from the pressure of the water-supply are shown on Sheets 3 and 5, and on Sheet 4 is shown an indicator, by which the operator of the drill can tell whether the water-supply is passing through the drill in the proper manner, and on Sheet 6 is shown the rotating clamp in connection with the drill tube or rod with a derrick, ropes, and other appliances by which the tube or rod can be raised when required, and when raised by either the pressure on the feed-regulator or by the ropes and windlass the clamping-jaws are free to rotate in the direction for raising the tube or rod.

A' represents a shell or casing forming a receiving-head.

B' is a nipple on the case A', and having an external screw-thread for the attachment of a hose, and a central opening or port $b'$ leading to the receiving-chamber.

C' is a nipple corresponding to B' and having a central port or opening $c'$ leading to the receiving-chamber.

D' is the receiving-chamber, to which water is supplied through the ports $b'$ and $c'$ by hose attached to the nipples B' and C' and leading to a supply. The ports or openings $b'$ and $c'$ are closed by a flap-valve $d'$, the valves opening inward to allow the water-supply to enter and closing down on a suitable seat around the ports.

E' is a cylinder screw-threaded into an annular flange $a'$ on the head A' to have communication with the chamber D'.

F' is a cap screw-threaded onto the end of the cylinder E' and having an air-vent.

G' is an eye or swivel secured in the cap F', and to which the lifting-ropes are connected.

H' is the first section of the drill rod or tube, to which other sections are added from time to time as required.

I' is a cap or head screw-threaded or otherwise secured to the upper end of the drill-tube H' and having in its under face a groove or channel with an inclined bearing-face to receive beveled anti-friction rollers $i'$.

J' is a cage having in its bottom an annular groove to receive the anti-friction rollers $i'$, and having through its side or wall openings $j'$ for the passage of water, and this cage is of a less diameter than the interior diameter of the cylinder E' to leave an annular passage $k'$ between it and the cylinder for the passage of the water.

K' is a head formed with the cage J' and having its upper end provided with a groove $l'$.

L' is the chamber of the cage J'.

M' is a packing, of leather, the edge of which turns down and lies within the groove $l'$.

N' is a packing-ring having the groove $m'$.

O' is a packing, of leather or other suitable material, the edge of which turns down and lies in the groove $m'$.

P' is a plug having a flange $n'$ corresponding in diameter to the interior of the cylinder E' and having on its exterior face a screw-thread $o'$ to enter a screw-threaded hole in the head K' and draw the packings M' and O' firmly to place. The inner end of the plug P', as shown, is provided with projections $p'$ to come in contact with the head I' and hold the head in the chamber L' against upward movement, and, as shown, the end of the plug inside of the projection $p'$ is countersunk, as at $q'$.

Q' is a valve shell or case forming the coupling between the first pipe-section H' and the next section and having on one side a stuffing-box.

R' is a valve-stem passing through the stuffing-box and carrying a valve on its inner end to act with a seat in the shell Q' and regulate the amount of water passing down the drill rod or tube.

S' is a hand-wheel secured to the end of the valve-stem R' and having a series of handles $s'$.

T' is a handle or lever having at one end a hook $t'$ to clasp the drill tube or rod, so that the body of the handle or lever can be engaged with a handle $s'$ on the wheel S' and turn the wheel by the rotation of the drill-tube.

U' are weights located on the drill-rod to assist in forcing the drill-rod down.

V' is a derrick for suspending the drill-rod by its ropes.

In use the weight of the drill rod or tube, either with or without the additional weights U', forces the rod or tube down to its work, and the water to wash away the cuttings is supplied through the interior of the rod or tube from the supply-chamber D' and cylinder E'. The water is supplied to the chamber D' by the hose attached to the nipples B' and C', and this water passes from the chamber D' up into the cylinder E', and through the passage $k'$ and openings $j'$ enters the chamber L' and passes into the drill-tube H', and in case the supply is too great the handle T' can be attached to the drill-rod above the case Q' to engage a spoke $s'$ of the wheel S' and turn the wheel to close down partially the valve on the stem R' and shut off the supply, and if the supply is too small the handle T' is placed on the drill-rod below the case Q' and engaged with a spoke $s'$ of the wheel S' to turn the wheel and open the valve on the stem R' as required for the increased supply.

The parts J', K', M', N', O', and P' form a piston fitting within the interior of the case, and this piston is connected with the drill-tube by the head I', which lies in the chamber L' of the cage J', and the chamber D' has a bumper to limit the descent of the piston, so as not to have its piston close the supply-ports, as shown in Fig. 27. This piston furnishes a means for raising the drill-tube by the pressure of the water in the cylinder E' in case the lower end of the drill-tube becomes clogged, as the pressure of the water will act against the piston, raising the piston, and with it the drill-tube, until the clogging has been washed away to allow the water to again flow to the drill to wash away the cuttings, and when the water is flowing through the drill-tube the pressure of the water in the cylinder E' on the piston will be relieved, allowing the piston and drill-tube to again descend to a working position, and in raising the piston the air between it and the cap F' is vented through the hole in the cap or in any other suitable manner.

The drill-tube is supported so as to be free to rotate by the head I', cage J', and anti-friction rollers $i'$, and the water in the chamber L' will keep the friction-rollers lubricated, so that they will run easy without friction, leaving the drill-tube free to rotate without imparting rotation to the head and cylinder E', and, as shown, the drill-rod passes through a packing $f'$ in a tubular boss $e'$ on the head A', and the packing is held in place by a screw-threaded plug $g'$, and having a flange $h'$, with locking-notches to receive a locking-bar attached to $e'$, by which the plug is held against being unscrewed by the rotation.

As shown in Fig. 27, a single supply-port for the head A' is provided, and the chamber D' is changed in its interior construction. The head I' is in the form of a plug screw-threaded into the end of the drill-tube, and the supply-holes $j'$ are provided in the body of the drill-tube. The cage J' is made in two parts, and the head K' is separate from the cage, and in place of a plug P' a cap-plate is used, and the several parts constituting the piston are secured together by tie-bolts. The remaining devices are essentially the same as the devices in Fig. 15, for when the supply is stopped by clogging at the drill end, preventing the water from flowing out, the pressure of the water in the cylinder E' will act on the piston in the same manner as in Fig. 15, and raise the drill-tube to a point where the clogging will be washed away, and when the clogging is removed the pressure in the cylinder is removed and the piston and drill-rod will again descend to the working-point.

The derrick and rotating device are shown in operation in connection with the supply-regulating device in Fig. 28.

The advantages of the feed-regulating device are, the thrust of the diamond drill, caused by the weight of the drill rod or tube, and the weights hung thereon, if used, in reference to the feed, is regulated by the water used for clearing away the cuttings. The pressure of the water used for clearing the cuttings operates on the piston in case of clogging and lifts the drill up so that the water can act and clear away the clogging, thus enabling an inexperienced person to run the drill without injurious effects from clogging, where with other diamond drills a skilled person is required. The drill tube or rod is swiveled in the support therefor, so as to run perfectly free, by anti-friction rollers $i'$, which prevent any binding at that point or elsewhere between the drill-tube and the supply-head and cylinder. The feed of the drill is governed with a uniform pressure by the water passing in between the supply-head and the piston at the top of the drill, and this pressure, if increased from any cause, creates a hydraulic pressure in and of itself to lift the drill-tube. The relief of the pressure by the water passing down in the drill-tube will be gradual, allowing the piston and drill-tube to descend gradually and prevent any striking or jar (as the drill-tube strikes) that would be injurious to either the drill or the regulating device. The shut-off provided in the drill-tube furnishes a ready means for regulating the supply passing through the drill-tube, and the handle or lever, in connection with the rotation of the drill-tube, enables the supply to be readily and quickly increased or diminished, as required, and by these various advantages the operation of the drill is rendered safe and reliable.

The indicator is attached to the supply-head between the head and the hose, and is shown in Figs. 24, 25, and 26, Sheet 4, wherein—

$A^2$ is a casing having on its outer edge ears $a^2$.

$B^2$ is a nipple having an opening or passage $b^2$ with a screw-thread to receive the nipple B'.

$C^2$ is a nipple having an exterior screw-thread for coupling on the hose and an opening or passage $c^2$.

$D^2$ is the chamber of the casing $A^2$, into which the passage $c^2$ leads and out from which the passage $b^2$ furnishes an outlet leading to the passage $b'$ of the casing or valve A'.

$E^2$ is an arm located in the chamber $D^2$.

$F^2$ is a rock-shaft mounted in the wall of the casing $A^2$ and in the cover.

$G^2$ is a rod pivotally connected to the outer end of the arm $E^2$ by a pin or pivot $g^2$. This rod at its outer end has secured thereto a head $e^2$, which seats against a shoulder $f^2$ in the passage $c^2$ when the arm $e^2$ is as shown in Fig. 25, and, as shown, the pivot end of the rod $G^2$ is circular and lies in a slot in the end of the arm $E^2$ and allows the arm to swing and the head to seat properly.

H² is a coil-spring located between the arm E² and the wall of the case A² and supported in position, as shown, by studs h² on the arm and wall.

I² is a pointer mounted on the end of the shaft F², which projects through the cover and is held in place by a nut i².

J² is a scale on the outer face of the cover, with which the pointer I² coacts.

K² is the cover, having ears k² coinciding with the ears a² of the case A², through which ears k² and a² bolts j² are passed to secure the cover to the casing A².

The rod G² is adjusted by the nuts g² to have the head e² seat on the shoulder f² and close the passage c² when the spring H² is at rest, or nearly so, and the pointer I² is adjusted in relation to the arm E², so that when the valve e² is seated the pointer will be at the commencement of the scale as shown in Fig. 24, indicating that the water is not passing through the chamber D², and consequently not flowing through the drill-tube. The water, when passing through the chamber D², will by its pressure on the valve e² carry the head inward, moving the arm E² therewith and turning the rock-shaft, which carries the pointer over the scale, and the distance the pointer is carried over will indicate the flow of the water. The spring H² should have a tension to return the arm E² when no water is flowing to seat the head e², and this tension is one that will be overcome by the pressure of the water when flowing.

In use the indicator is attached to the head A' between the head and the supply-hose—one for each supply when the head has more than one supply. When the water is flowing through the drill-tube in a proper manner, the pressure of the supply passing through the chamber D² will move the pointer I² over the scale J² according to the force of the pressure; but when the flow stops from any cause in the drill-tube the water will cease to pass through the chamber D² and the spring H² will act and move the arm E² back, turning the pointer on the scale back, which notifies the operator that the water-supply to the drill is not working, so that the operator can take the proper steps to prevent injurious effects from the stoppage of the water-supply and again start the supply.

The indicator is a desirable feature, as by its use the operator has only to glance thereat to discover whether the water supply is working as it should, and other indicating devices than that shown can be used by which the operator can determine the state of the water-supply.

The valve d' in the head A' prevents a return of the water by closing down in case of a bursting of the hose or other accident, and where two supplies are used if one supply becomes inoperative from any cause the valve for that supply will close down, leaving the other supply to furnish the water for the drill-tube and preventing the water from entering the head at the working-supply and passing out at the non-working one.

In case the weight of the drill-tube is too much for the pressure on the piston to lift the rod in case of clogging, the lifting-ropes and windlass of Fig. 28 can be used to lift the drill-tube for the water-supply to clear the clogging.

The pressure on the drill when at work must be one that will cause the drill to cut, and at the same time this pressure must not be excessive, or one that will break the drill or tear out the diamonds when a diamond drill is used. The required pressure is had on the drill by the weight of the drill-tube alone, or by the addition of weights, and the pressure is governed by the water-supply through the pressure-piston, and this supply to govern the piston is regulated by the valve in the drill-tube on the stem R', which valve forms a shut-off by which the supply passing through the drill-tube can be decreased or increased.

The pressure on the piston is upward, and lifts the drill-tube so that part of the weight of the tube will be carried by the piston, and the greater the pressure on the piston the more weight will be carried. The opening of the shut-off will give an increased flow of water through the drill-tube, producing a reduced pressure on the piston, by which a greater weight is transferred to the drill, and this increased weight of the drill-tube, by the reduced pressure on the piston, gives an increased pressure on the drill. The closing down of the shut-off gives a decreased flow through the drill-tube, producing an increased pressure on the piston, by which the weight carried by the piston is increased, and decreased pressure is had on the drill.

The shut-off can be adjusted to give the flow through the drill-tube for a pressure on the piston to carry as much of the weight of the drill-tube as is necessary to give the pressure required on the drill, the result being the regulating of the water-supply passing through the drill-tube to govern the pressure on the drill.

What I claim as new, and desire to secure by Letters Patent, is—

1. The combination of a supporting-frame, a plate J thereupon, the ring I, having the fixed inwardly-projecting pins g, and the rollers J, loosely mounted on the pins, with the plate G, having the gear d, and the shaft E, having the driving-pinion F, substantially as described.

2. The combination of a supporting-frame, a plate J thereupon, having the annular groove b, the ring I, having the inwardly-projecting pins g, the rollers H, loose on the pins, the top plate G, having the gear d and provided with the pendent annular flange i, entering between the pins to retain the rollers thereupon, and the shaft E, having the driving-pinion F, substantially as described.

3. The combination of a frame, a supporting-plate J, a series of anti-friction rollers H, resting on the plate, the rotating top plate G, resting on the rollers, and a clamp mounted on the top plate for clamping a drill-tube, substantially as described.

4. The rotating plate G, having an annular groove $f$, with an inclined bearing-face, in combination with the beveled anti-friction rollers H, and bottom plate J, having the annular groove $h$, with an inclined bearing-face for giving the plate G a free support for rotating purposes, substantially as specified.

5. The combination, with the supporting-plate J, of the ring I, carrying a series of beveled pins $g$, and the anti-friction rollers H, carried by the pins, substantially as described.

6. The combination, with the supporting-plate J, having a groove $b$, of the anti-friction rollers H, resting on the supporting-plate, and the rotating plate G, having the depending flange $i$, for preventing inward end movement of the rollers, substantially as described.

7. The rotating top plate G, having a central opening, and the parallel guide-plates M, secured to the top plate at opposite sides of the central opening, and provided with turned-up edges $l$, to provide grooves between such edges and the face of the top plate, adjustable plates N, having flanges $n$, engaging said grooves, clamping-jaws carried by the adjustable plates, and screws P, for adjusting the plates and their jaws, substantially as described.

8. The rotating plate G, having guideways, in combination with the plates N, carrying clamping-jaws and adjusting-screws P, for advancing and receding the plates N, substantially as and for the purpose specified.

9. The plates N, having at each end a head O to receive a nut $r'$ and carrying clamping-jaws, in combination with the adjusting-screws P, substantially as and for the purposes specified.

10. The plates N, having at each end a head O and carrying clamping-jaws, in combination with the adjusting-screws P, chain Q, and sprocket-wheels $q$, substantially as specified.

11. The guide-plates M, having ears $m$, and screws P, having the ring $p$, in combination with sliding plates N, carrying clamping-jaws, substantially as and for the purposes specified.

12. The combination of a rotating top plate G, the plates N, sliding on and rotating with the top plate and having at each end a head O, and carrying clamping-jaws for rotating a drill-tube, with the adjusting-screws P and rubber cushions $r$, substantially as described.

13. The combination, with the rotating top plate G, of the plates N, sliding on and rotating with the top plate, the shafts S, carried by the sliding plates, the clamping-jaws T, loose on the shafts for rotating a drill-tube, and adjusting-screws P, engaging the sliding plates, substantially as described.

14. The rotating plate G, guide-plate M, having the ears $m$, and sliding plates N, having at each end a head O, in combination with the adjusting-screws P, each having a ring $p$, ears R, shafts S, and gripping-jaws T, substantially as and for the purpose specified.

15. The combination, with a cylinder E', having a fluid-supply, of a hollow piston communicating with and raised by the fluid entering the cylinder, and a rotated drill-tube connected and communicating with the piston for raising the drill-tube when the drill becomes clogged to remove the clog, and at the same time relieve the piston from the fluid-pressure and permit the piston and drill-tube to descend, substantially as described.

16. A well-sinking mechanism comprising a cylinder having a fluid-supply, a hollow piston communicating with and raised by the fluid entering the cylinder, a drill-tube rotating in the cylinder and communicating with the piston, and a clamp for rotating the drill-tube while it moves endwise for raising the drill-tube while it rotates when the drill becomes clogged to remove the clog, and at the same time relieve the fluid-pressure on the piston and permit the piston and drill-tube to descend, substantially as described.

17. The combination, with a tubular drill-rod and a shut-off, of the stem R', wheel S', and lever T', for operating and closing the valve from the rotation of the drill-rod, substantially as specified.

18. The combination, with a water-cylinder having a water-supply chamber, a piston, and a rotating drill-tube receiving water from the cylinder, of an indicator on the water-supply chamber which indicates the quantity of water flowing from the water-supply chamber toward the drill-tube, substantially as described.

19. The case $A^2$, having an inlet $c^2$ and an outlet $b^2$ and a chamber $D^2$, in combination with an arm $E^2$, rock-shaft $F^2$, rod $G^2$, carrying the valve $e^2$, spring $H^2$, pointer $I^2$, and scale $J^2$, substantially as and for the purposes specified.

20. The combination, with a drill-tube and a water-supply therefor, of an indicator on the water-supply which automatically indicates the decrease and cessation of the flow of water through the drill-tube to the drill, substantially as described.

21. The combination, with the drill-tube, cylinder, piston, and pipe or hose for supplying the cylinder with water to pass to the drill, of an indicator located between the cylinder and the supply pipe or hose which automatically indicates the decrease and cessation of the flow of water through the drill-tube to the drill, substantially as described.

22. The combination, with a supply-head A' and cylinder E', of a case $A^2$, having an inlet and an outlet port and a chamber $D^2$, a rock-shaft $F^2$, having an arm $E^2$, a rod $G^2$, provided with a valve $e^2$, seating on the inlet-port of the case, a spring $H^2$, acting on the arm to press the valve to its seat, a pointer I² on the rock-shaft, and a scale J², substantially as described.

23. The combination, with a rotating plate G, of the plates N, the shafts S, and the rotary clamping-jaws journaled thereupon, of the adjustable collars U, adapted to the shafts between the plates and clamping-jaws, and the right and left hand screws P, for adjusting the plates and clamping-jaws, substantially as described.

24. A drill-tube and a pressure-piston therefor, in combination with a shut-off valve in the drill-tube for regulating the water-supply and governing the pressure on the drill, substantially as specified.

25. The combination, with a cylinder, of a pressure-piston, a drill-tube, and a shut-off in the drill-tube, substantially as and for the purposes specified.

26. The clamping-jaws T, composed of separate and independent reversible rings, substantially as described.

27. The combination of the clamping-jaws T, each composed of a series of independent removable and replaceable rings, with the adjusting collars U, for setting the rings to grip objects of varying diameter, substantially as described.

MATTHEW T. CHAPMAN.

Witnesses:
HARRY T. JONES,
ROBERT MULLAR.